United States Patent Office 2,737,712
Patented Mar. 13, 1956

2,737,712

SOLDER AND PROCESS FOR MAKING AND USING SAME

Fred E. Larson, Godfrey, Ill.

No Drawing. Application July 23, 1952,
Serial No. 300,490

6 Claims. (Cl. 29—503)

This invention relates to solder and process for making and using it.

The solder of this invention has primary utility in the soldering of tinned wires to waxed or unwaxed aluminum foil, as in soldering lead wires to aluminum foil capacitors. However, while the following description treats of the application of the solder of this invention to waxed or unwaxed thin aluminum foil, the solder of this invention is capable of numerous other uses.

One of the objects of this invention is to provide a solder, suitable for use on aluminum, which is non-corrosive, which wets the aluminum to be soldered, and which does not emit toxic fumes nor dross excessively at elevated temperatures.

Another object is to provide such a solder which requires no soldering flux, and which may be used on waxed surfaces without their special preparation.

Another object is to provide a method of making such a solder.

Another object is to provide a method of using such a solder which permits the soldering of wires and the like to thin aluminum foil without the use of soldering irons or torches.

Other objects will become apparent to those skilled in the art in the light of the following description.

In accordance with this invention, generally stated, a solder is compounded of lead, tin, antimony, aluminum and zinc. The solder so produced may be used to solder heavy aluminum members by the usual methods, using a soldering iron or torch. In soldering thin aluminum foil, however, a special technique is used to produce uniform, strong joints without the application of excessive heat or the use of soldering irons or torches.

The following description is illustrative of the process of producing the solder of this invention. An ingredient of the final solder bar is first produced, as follows: a convenient quantity, e. g. one pound, of 50-50 (half tin, half lead) solder is melted in a black sheet steel pot. The temperature of the melt is raised as quickly as possible to about 450° to 500° F. The pot may be open or covered during this heating. When the temperature of 450° to 500° F. has been reached, an amount of antimony equal equal in weight to the amount of 50-50 solder initially melted is introduced and stirred into the molten solder. Lump metallic antimony, laboratory grade, is suitable for this use. The pot is then covered and the temperature of the mixture is raised until the antimony melts and is uniformly distributed. The dross is then skimmed off and the metal is poured into a mold to form what is hereinafter referred to as the antimony solder bar.

A final solder bar is then made as follows: 16¼ ounces of 50-50 (tin-lead) solder is melted in a black sheet steel pot. The temperature of the molten solder is raised to 600° F. or higher, and one ounce plus 50 grains (approximately 7% by weight of the 50-50 solder) of the antimony solder bar, the preparation of which has been described, is introduced. The antimony solder bar is preferably broken up into lumps of one-quarter inch or less before its introduction.

The temperature of the solder is raised until the lumps of antimony solder bar have melted. The contents of the pot may be stirred to distribute the components uniformly. The molten metal should, however, be covered during this heating.

When the antimony solder bar is completely melted and distributed in the molten 50-50 solder, two grains (approximately .03% by weight of the 50-50 solder) of aluminum are added. The aluminum, which in this embodiment is in the form of foil of 99+ percent purity, is submerged in the molten metal.

When the aluminum disappears, 4 ounces (approximately 24.6% by weight of the 50-50 solder) of electrolytic zinc (99+ percent pure) is added, after which 4 more grains (approximately .06% by weight of the 50-50 solder) of aluminum is added.

After the last addition of aluminum, the mixture is stirred gently with a stick of green elm wood, the dross being skimmed back in the process until the surface of the molten metal is clear and shiny where the dross is skimmed off. The temperature of the melt is now at about the melting point of aluminum.

At this point, one-fourth ounce (approximately 1½% by weight of the 50-50 solder) of clear rosin, of the character known as bow string rosin, is introduced, and the melt is stirred with the elm stick until the rosin is consumed, in a minute or two.

The dross is now removed and the molten charge of bright metal is poured into a suitable mold to produce the final solder bar.

Percentagewise in terms of the weight of the final solder bar, the amounts of the various constituents which go to make up the final solder bar, as described above, are as follows:

|  | Per cent |
| --- | --- |
| 50-50 (tin-lead) solder | 76.01 |
| Antimony solder bar | 5.21 |
| Aluminum (.023% + .042%) | .07 |
| Zinc | 18.71 |
|  | 100.00 |

The rosin is not listed as one of the constituents which go to make up the final solder bar, because it is consumed in the process and hence does not appear in the final solder bar.

While exact amounts of the various constituents of the solder have been set out in the illustrative example, it has been found that variations of 5% in the proportions of the various components are permissible.

A solder superior to commercial solders known heretofore but less desirable than the solder described above may be produced by substituting pure tin for the 50-50 tin-lead solder at every place in which the 50-50 solder is used. The steps to be followed, both in producing the preliminary antimony solder bar, and the final solder are the same. Such a solder is more expensive than the preferred embodiment described. It has a lower melting point, which is not always desirable, but which may be useful in some applications.

The order of the steps in the production of the final solder bar is significant to properly combine the various metals. Some variation in the process, however, is possible. For example, instead of producing a solidified antimony solder bar, breaking the bar and adding lumps thereof to the melt of the final solder bar, a proper quantity of the molten antimony solder may be added to the melt of the final solder bar at the appropriate stage. In commercial practice, a solder superior to that now known may be made in large quantities by melting down all the elements, i. e. 50–50 (tin-lead) solder 78.61%, antimony 2.61%, aluminum .07% and zinc 18.71%, in a common closed pot in one operation, stirring the molten mass with a green elm stick and finishing with 1.2% (of the weight of the entire mass) of clear rosin. The rosin is consumed in the process and does not appear in the final solder bar. In making large amounts of the solder, the rosin should be added a little at a time to avoid an explosion. Also a well-ventilated hood should be used.

In applying the solder of this invention to extremely thin aluminum sheets, as in soldering lead wires to aluminum foil condensers, a convenient quantity of the final soldering bar is melted in a black sheet steel pot. When the molten solder has reached a temperature of about 950° F. a lead wire, which has already been tinned in the usual way, is dipped therein. The wire is removed from the solder immediately and the aluminum foil is stroked therewith. One or two strokes of the lead wire across the aluminum foil is sufficient to raise the temperature of the latter to the desired point. The lead wire is brought to rest and held in position during the second or third stroke. If the solder on the lead wire has solidified before the lead wire is brought to rest, the wire can simply be dipped again and the process repeated.

If the aluminum foil has been treated with wax, then the solder-laden lead wire should be pressed against the foil with a turning motion so as to penetrate the waxy film. However, no other preparation of the waxed surface is necessary.

It has been found that with some lead wires (apparently depending upon how they were originally tinned), it is desirable to coat the lead wires with a solution of rosin in alcohol. The solution is prepared by dissolving one ounce of clear rosin, such as bow string rosin, in one quarter pint of 90%+ ethyl alcohol. The lead wires are dipped in this solution and permitted to dry in the open before they are dipped in the molten solder.

In soldering heavier aluminum plate, the usual soldering iron or torch techniques may be employed.

The solder of this invention has proved to have numerous advantages over the aluminum solders known heretofore. When in a molten state in an open pot at 1100° F., more or less, the solder and the fumes therefrom have no apparent toxic effect on humans. The solder will not dross excessively when held at soldering temperatures (around 1050° F.) over long periods of time in an open solder pot. This is highly desirable, since the presence of dross in solder on a lead wire is likely to produce a connection with poor electrical and mechanical characteristics. No corrosive effects on the lead wires or on the aluminum foil, when the solder is used to connect the two, are evident. High voltage tests, at more than double the rated voltage, made on capacitors to which lead wires were soldered with the solder of this invention, showed no breakdown at the soldered joints even after many hundreds of hours of testing. The solder actually wets the surface of the aluminum when applied at proper temperatures and thus produces a firm bond, and at the same time, makes the use of the solder on aluminum simple and rapid.

Having thus described my invention what is claimed and desired to be secured by Letters Patent is:

1. The process of making solder of the character described, comprising making, as a preliminary step, an antimony solder by melting a quantity of 50–50 lead-tin solder and combining with the melted 50–50 solder an equal weight of antimony; and, as the final steps, successively melting, apart from the said antimony solder a second quantity of 50–50 tin-lead solder, raising the temperature of said second quantity of 50–50 solder to approximately 600° F., adding thereto an amount of the said antimony solder equal in weight to approximately 7% of the weight of the second quantity of 50–50 solder, adding thereto an amount of substantially pure aluminum equal to approximately .03% of the weight of the said second quantity of 50–50 solder, melting therein an amount of substantially pure zinc equal to approximately 24.6% the weight of the said second quantity of 50–50 solder, introducing therein a further amount of substantially pure aluminum equal to approximately .06% of the weight of the said second quantity of 50–50 solder, stirring the melt gently with a green elm stick while heating until the surface of the molten metal is clear and shiny where the dross is skimmed off, introducing an amount of rosin equal to approximately 1.5% of the weight of the said second quantity of 50–50 solder, stirring the melt until the rosin is consumed, and pouring the melt into a mold to produce a solder bar.

2. The process of making solder of the character described comprising successively melting a quantity of 50–50 (tin-lead) solder, raising the temperature of said 50–50 solder to at least 600° F., adding thereto an alloy of approximately half and half antimony and 50–50 (tin-lead) solder in an amount equal in weight to approximately 7% of the weight of the first mentioned quantity of 50–50 solder, submerging therein amount of aluminum equal to approximately .03% of the weight of the said first mentioned quantity of 50–50 solder, melting therein an amount of zinc equal to approximately 25% of the weight of said first quantity of 50–50 solder, introducing therein a further amount of aluminum equal to approximately .06% of the weight of the said first mentioned quantity of 50–50 solder, bringing all of the constituents to a molten state and distributing them substantially uniformly.

3. An aluminum solder of the character described, the composition of which, in terms of weight, is approximately:

| | Percent |
|---|---|
| 50–50 (tin-lead) solder | 78.61 |
| Antimony | 2.61 |
| Aluminum | .07 |
| Zinc | 18.71 |

4. The process of soldering a tinned wire to aluminum foil comprising melting solder of a composition, by weight of approximately

| | Percent |
|---|---|
| A solder metal taken from the group consisting of pure tin and a 50–50 (tin-lead) alloy | 78.61 |
| Antimony | 2.61 |
| Aluminum | .07 |
| Zinc | 18.71 | dipping the end of said wire into the molten solder to coat the end of said wire with molten solder, removing the wire therefrom, stroking the surface of said foil while the solder on said wire is still molten to heat said foil and wet it with said molten solder, bringing the wire to rest at its desired location on said foil while the solder is still molten and allowing the solder to solidify while the wire is maintained in position against the foil.

5. An aluminum solder of the character described, the composition of which, in terms of weight, is approximately:

| | Percent |
|---|---|
| Tin | 78.61 |
| Antimony | 2.61 |
| Aluminum | .07 |
| Zinc | 18.71 |

6. An aluminum solder of the character described comprising approximately 78.61% of a solder metal taken from the group consisting of pure tin and a 50–50 tin-lead alloy, 2.61% antimony, .07% aluminum and 18.71% zinc.

References Cited in the file of this patent

UNITED STATES PATENTS

| | | | |
|---|---|---|---|
| 122,408 | Saunders | Jan. 2, | 1872 |
| 320,445 | Randolph | June 16, | 1885 |
| 456,898 | Miller | July 28, | 1891 |
| 549,610 | Ramage | Nov. 12, | 1895 |
| 1,452,750 | Mulligan | Apr. 24, | 1923 |
| 1,584,219 | De May | May 11, | 1926 |
| 1,813,657 | Boothman et al. | July 7, | 1931 |
| 1,845,103 | Schubert | Feb. 16, | 1932 |
| 2,381,025 | Addink | Aug. 7, | 1945 |
| 2,426,650 | Sivian | Sept. 2, | 1947 |
| 2,662,500 | Fort et al. | Dec. 15, | 1953 |